US011816917B2

(12) United States Patent
Kim et al.

(10) Patent No.: US 11,816,917 B2
(45) Date of Patent: Nov. 14, 2023

(54) MULTI-SENSOR STRUCTURE AND IMAGE DISPLAY DEVICE INCLUDING THE SAME

(71) Applicant: DONGWOO FINE-CHEM CO., LTD., Jeollabuk-do (KR)

(72) Inventors: Jong Min Kim, Gyeonggi-do (KR); Dong Pil Park, Incheon (KR); Jae Hyun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 151 days.

(21) Appl. No.: 17/533,393

(22) Filed: Nov. 23, 2021

(65) Prior Publication Data

US 2022/0083172 A1    Mar. 17, 2022

Related U.S. Application Data

(63) Continuation of application No. PCT/KR2020/006663, filed on May 21, 2020.

(30) Foreign Application Priority Data

May 23, 2019  (KR) .......................... 10-2019-0060453

(51) Int. Cl.
*G06V 40/13* (2022.01)
*G06F 3/044* (2006.01)
(Continued)

(52) U.S. Cl.
CPC ........ *G06V 40/1306* (2022.01); *G06F 3/0445* (2019.05); *G06F 3/0446* (2019.05);
(Continued)

(58) Field of Classification Search
CPC . G06V 40/1306; G06F 3/0445; G06F 3/0446; G06F 2203/04111; G06F 2203/04112; H01Q 1/243; H01Q 1/36
See application file for complete search history.

(56) References Cited

U.S. PATENT DOCUMENTS 10,467,449 B2 * 11/2019 Jang ........................ G06F 18/00
2014/0346027 A1    11/2014 Li et al.
(Continued)

FOREIGN PATENT DOCUMENTS

KR    10-2013-0095451 A1    8/2013
KR    10-2014-0100822 A     8/2014
(Continued)

OTHER PUBLICATIONS

International Search Report for PCT/KR2020/006663 dated Aug. 26, 2020.

*Primary Examiner* — Afroza Chowdhury
(74) *Attorney, Agent, or Firm* — The PL Law Group, PLLC (57) ABSTRACT

A multi-sensor structure according to an embodiment of the present disclosure includes a base layer, a first touch-fingerprint sensor electrode layer disposed on a top surface of the base layer, a second touch-fingerprint sensor electrode layer disposed at an upper level of the first touch-fingerprint sensor electrode layer, and an antenna electrode layer spaced apart from the first touch-fingerprint sensor electrode layer and the second touch-fingerprint sensor electrode layer in a planar direction. The antenna electrode layer is disposed at the same level as that of the first touch-fingerprint sensor electrode layer or the second touch-fingerprint sensor electrode layer. A sensor in which a touch-fingerprint sensing and an antenna signal sensing are integrated is provided.

14 Claims, 6 Drawing Sheets

(51) Int. Cl.
*H01Q 1/24* (2006.01)
*H01Q 1/36* (2006.01)

(52) U.S. Cl.
CPC ............... *H01Q 1/243* (2013.01); *H01Q 1/36* (2013.01); *G06F 2203/04111* (2013.01); *G06F 2203/04112* (2013.01)

(56) References Cited

U.S. PATENT DOCUMENTS

| | | | |
|---|---|---|---|
| 2015/0255856 A1* | 9/2015 | Hong | H01Q 21/061 343/702 |
| 2016/0354036 A1* | 12/2016 | Jo | A61B 5/282 |
| 2017/0139520 A1* | 5/2017 | Yeh | H01Q 9/30 |
| 2019/0042045 A1* | 2/2019 | Lee | G06F 1/1652 |

FOREIGN PATENT DOCUMENTS

| | | |
|---|---|---|
| KR | 10-2018-0026597 A | 3/2018 |
| KR | 10-2018-0097212 A | 8/2018 |
| WO | WO 2013/063176 A1 | 5/2013 |
| WO | WO 2018/124343 A1 | 7/2018 |

\* cited by examiner

MULTI-SENSOR STRUCTURE AND IMAGE DISPLAY DEVICE INCLUDING THE SAME

CROSS REFERENCE TO RELATED APPLICATIONS AND CLAIM OF PRIORITY

The present application is a continuation application to International Application No. PCT/KR2020/006663 with an International Filing Date of May 21, 2020, which claims the benefit of Korean Patent Application Nos. 10-2019-0060453 filed on May 23, 2019 at the Korean Intellectual Property Office, the disclosures of which are incorporated by reference herein in their entirety.

BACKGROUND

1. Field

The present invention relates to a multi-sensor structure and an image display device including the same. More particularly, the present invention relates to a multi-sensor structure including a touch sensor and an antenna and an image display device including the same.

2. Description of the Related Art

Recently, a touch sensor is combined with an image display device so that an electronic device capable of inputting direction of a user by selecting an instruction displayed on the image display device with a finger or a tool is developed as various shapes, e.g., a tablet personal computer.

Further, the image display device is combined with a communication device such as a smartphone form. Thus, an antenna for a communication of a high-frequency or ultra-high frequency band is also combined in the image display device.

Recently, as various sensing functions are provided in the image display device, a fingerprint sensor capable of directly sensing a fingerprint of a user is added in the image display device.

As described above, when the fingerprint sensor, the touch sensor and the antenna are included in one image display device, a design construction for embedding the large number of electrodes in a limited space is required. Additionally, optical interruption with a display panel of the image display device and an image generated therefrom may be caused by the electrodes.

For example, a touch screen panel in which the touch sensor is combined with various image display devices as disclosed in Korean Patent Published Application No. 2014-0092366. Korean Patent Published Application No. 2013-0095451 discloses an antenna integrated in a display panel. However, an effective construction of the antenna and the touch sensor in the image display device is not disclosed.

SUMMARY

According to an aspect of the present invention, there is provided a multi-sensor structure having improved optical property and spatial efficiency.

According to an aspect of the present invention, there is provided an image display device including a multi-sensor structure with improved optical property and spatial efficiency.

The above aspects of the present invention will be achieved by one or more of the following features or constructions:

(1) A multi-sensor structure, including: a base layer; a first touch-fingerprint sensor electrode layer disposed on a top surface of the base layer; a second touch-fingerprint sensor electrode layer disposed at an upper level of the first touch-fingerprint sensor electrode layer; and an antenna electrode layer spaced apart from the first touch-fingerprint sensor electrode layer and the second touch-fingerprint sensor electrode layer in a planar direction, the antenna electrode layer being disposed at the same level as that of the first touch-fingerprint sensor electrode layer or the second touch-fingerprint sensor electrode layer.

(2) The multi-sensor structure according to the above (1), further including an insulating interlayer covering the first touch-fingerprint sensor electrode layer.

(3) The multi-sensor structure according to the above (2), wherein the antenna electrode layer is disposed on the insulating interlayer together with the second touch-fingerprint sensor electrode layer.

(4) The multi-sensor structure according to the above (2), wherein the insulating interlayer covers the antenna electrode layer.

(5) The multi-sensor structure according to the above (1), wherein the first touch-fingerprint sensor electrode layer includes first fingerprint sensing lines, and the second touch-fingerprint sensor electrode layer includes second fingerprint sensing lines extending in a direction intersecting the first fingerprint sensing lines.

(6) The multi-sensor structure according to the above (5), wherein the antenna electrode layer includes a mesh pattern.

(7) The multi-sensor structure according to the above (6), wherein the mesh pattern of the antenna electrode layer includes: first antenna electrode lines having the same line width and spacing distance as those of the first fingerprint sensing lines; and second antenna electrode lines having the same line width and spacing distance as those of the second fingerprint sensing lines.

(8) The multi-sensor structure according to the above (6), wherein the first touch-fingerprint sensor electrode layer includes touch sensing electrodes, and the touch sensing electrodes include a mesh pattern having the same shape as that of the antenna electrode layer.

(9) The multi-sensor structure according to the above (5), wherein each of the first fingerprint sensing lines includes first sub-lines connected in parallel with each other, and each of the second fingerprint sensing lines includes second sub-lines connected in parallel with each other.

(10) The multi-sensor structure according to the above (5), wherein the first touch-fingerprint sensor electrode layer further includes first touch sensing lines, and the second touch-fingerprint sensor electrode layer further includes second touch sensing lines extending in a direction intersecting the first touch sensing lines.

(11) The multi-sensor structure according to the above (10), each of the first touch sensing lines includes first sub-lines connected in parallel with each other, and each of the second touch sensing lines includes second sub-lines connected in parallel with each other.

(12) The multi-sensor structure according to the above (10), wherein each of the first touch sensing lines and the first fingerprint sensing lines includes a plurality of first sub-lines having the same line width and the same pitch, and each of the second touch sensing lines and the second fingerprint sensing lines includes a plurality of second sub-lines having the same line width and the same pitch.

(13) The multi-sensor structure according to the above (1), wherein the top surface of the base layer includes a touch sensor electrode area at a central area thereof, and an antenna electrode area and a fingerprint sensor electrode area which are separated from each other at a peripheral area with respect to the touch sensor electrode area.

(14) The multi-sensor structure according to the above (1), wherein the antenna electrode layer includes an antenna unit including a radiator, a transmission line extending from the radiator and a signal pad connected to an end portion of the transmission line.

(15) The multi-sensor structure according to the above (14), wherein the antenna unit further includes ground pads facing each other with respect to the signal pad.

(16) An image display device, including: a display panel; and the multi-sensor structure according to embodiments as described above stacked on the display panel.

A multi-sensor structure according to exemplary embodiments of the present invention may include a touch-fingerprint sensor electrode and an antenna electrode. In exemplary embodiments, the touch-fingerprint sensor electrode and the antenna electrode may be allocated in a separate area in a planar view and may be disposed at the same level or at the same layer. Thus, a touch sensing and an antenna signal sensing may be effectively implemented in the same device while preventing a reduction of transmittance due to an electrode overlap and a moire phenomenon with a display panel.

In some embodiments, a touch-fingerprint sensor electrode layer and an antenna electrode layer may include, e.g., a mesh pattern having the same structure, and thus a pattern uniformity may be enhanced to prevent a visible recognition of the electrodes to a user.

DETAILED DESCRIPTION OF THE EMBODIMENTS

According to exemplary embodiments of the present invention, there is provided a multi-sensor structure including a touch-fingerprint sensor electrode and an antenna electrode. An image display device including the multi-sensor structure is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The term "touch sensor" used herein indicates a sensor accepting an instruction and generating a signal according to a touch from a finger of a user or an inputting tool. The term "fingerprint sensor" used herein includes a sensor directly recognizing a fingerprint shape and transferring a signal or an instruction.

Figure 1:
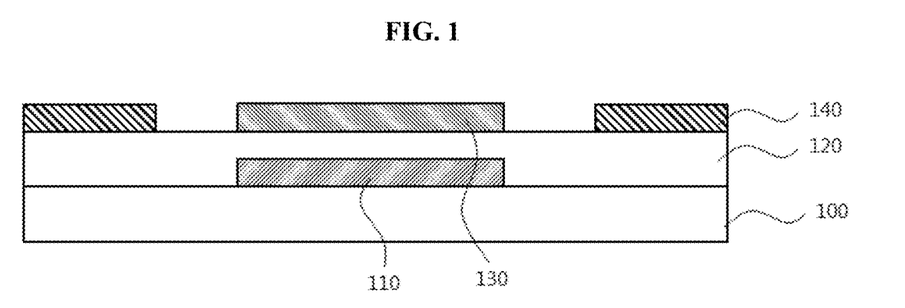
FIGS. 1 and 2 are schematic cross-sectional views illustrating a stack construction of a multi-sensor structure in accordance with exemplary embodiments.
Figure 2:
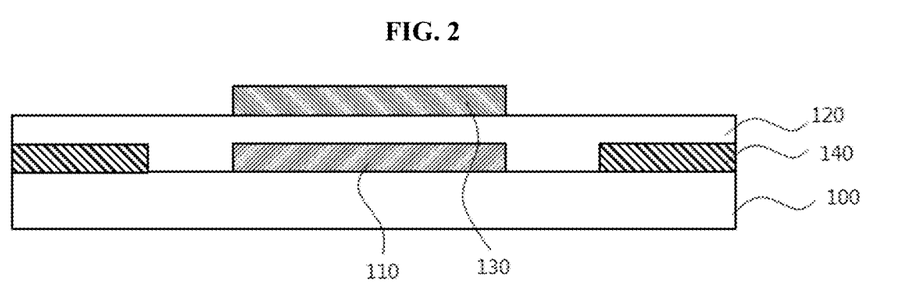

FIGS. 1 and 2 are schematic cross-sectional views illustrating a stack construction of a multi-sensor structure in accordance with exemplary embodiments.

Referring to FIG. 1, the multi-sensor structure may include a touch-fingerprint sensor electrode layer 110 and 130 and an antenna electrode layer 140 formed on a base layer 100.

The base layer 100 may include a supporting layer or a film-type member for forming the touch-fingerprint sensor electrode layer 110 and 130 and the antenna electrode layer 140. For example, the base layer 100 may include a film material commonly used in a touch sensor, e.g., glass, a polymer and/or an inorganic insulation material. Non-limiting examples of the polymer may include a cyclo olefin polymer (COP), polyethylene terephthalate (PET), polyacrylate (PAR), polyetherimide (PEI), polyethylene naphthalate (PEN), polyphenylene sulfide (PPS), polyallylate, polyimide (PI), cellulose acetate propionate (CAP), polyethersulfone (PES), cellulose triacetate (TAC), polycarbonate (PC), cyclic olefin copolymer (COC), polymethyl methacrylate (PMMA), etc. The inorganic insulation material may include, e.g., silicon oxide, silicon nitride, silicon oxynitride, a metal oxide, etc.

In some embodiments, a layer or a film member of an image display device to which the multi-sensor structure is applied may serve as the base layer 100. For example, an encapsulation layer or a passivation layer included in a display panel may serve as the base layer 100.

The touch-fingerprint sensor electrode layers 110 and 130 may include a first touch-fingerprint sensor electrode layer 110 and a second touch-fingerprint sensor electrode layer 130. The first touch-fingerprint sensor electrode layer 110 may be disposed on a top surface of the base layer 100.

An insulating interlayer 120 may be formed on the top surface of the base layer 100. The insulating interlayer 120 may cover the first touch-fingerprint sensor electrode layer 110.

The insulating interlayer 120 may include an inorganic insulating material such as glass, silicon oxide, silicon nitride, etc., or an organic insulating material such as an acrylic resin, a siloxane resin, etc. In some embodiments, the insulating interlayer 120 may serve as a dielectric layer for the antenna electrode layer 140.

The second touch-fingerprint sensor electrode layer 130 may be disposed at an upper level of the first touch-fingerprint sensor electrode layer 110. For example, the second touch-fingerprint sensor electrode layer 130 may be disposed on the insulating interlayer 120.

The first touch-fingerprint sensor electrode layer 110 and the second touch-fingerprint sensor electrode layer 130 may overlap each other in a thickness direction or in a planar view.

The antenna electrode layer 140 may be disposed on the insulating interlayer 120. In exemplary embodiments, the antenna electrode layer 140 may be disposed at an upper level of the first touch-fingerprint sensor electrode layer 110 and may be disposed at the same level as that of the second touch-fingerprint sensor electrode layer 130.

In some embodiments, the antenna electrode layer 140 may not overlap the touch-fingerprint sensor electrode layers 110 and 130 in the thickness direction.

The antenna electrode layer 140 may be formed at the same level as that of the second touch-fingerprint sensor electrode layer 130 so that a thickness or a volume of the multi-sensor structure may be reduced. Further, the antenna electrode layer 140 may be formed using the same conductive layer or the same etching process as that of the second touch-fingerprint sensor electrode layer 130.

The antenna electrode layer 140 may be disposed at an upper level of the first touch-fingerprint sensor electrode layer 110 so that signal shielding and radiation interference to the antenna electrode layer 140 may be reduced or suppressed.

The touch-fingerprint sensor electrode layers 110 and 130 and/or the antenna electrode layer 140 may include a low resistance metal such as silver (Ag), gold (Au), copper (Cu), aluminum (Al), platinum (Pt), palladium (Pd)), chromium (Cr), titanium (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy including at least one thereof. These may be used alone or in a combination thereof.

For example, the touch-fingerprint sensor electrode layers 110 and 130 and/or the antenna electrode layer 140 may include silver (Ag) or a silver alloy, for example, a silver-palladium-copper (APC) alloy to implement a low resistance. In some embodiments, the antenna units 120 and 220 may include copper (Cu) or a copper alloy (e.g., a copper-calcium (CuCa) alloy) in consideration of low resistance and fine line width patterning.

In an embodiment, the touch-fingerprint sensor electrode layers 110 and 130 and/or the antenna electrode layer 140 may include copper (Cu) or a copper alloy (e.g., a copper-calcium (Cu—Ca) alloy) in consideration of low resistance and pattern formation with a fine line width.

In some embodiments, the touch-fingerprint sensor electrode layers 110 and 130 and/or the antenna electrode layer 140 may include a transparent conductive oxide such as indium tin oxide (ITO), indium zinc oxide (IZO), zinc oxide (ZnOx), indium zinc tin oxide (IZTO), cadmium tin oxide (CTO), etc.

For example, the touch-fingerprint sensor electrode layers 110 and 130 and/or the antenna electrode layer 140 may have a multi-layered structure including a metal layer or alloy layer, and a transparent conductive oxide layer.

Referring to FIG. 2, the antenna electrode layer 140 may be located at the same layer or at the same level as that of the first touch-fingerprint sensor electrode layer 110. For example, the antenna electrode layer 140 and the first touch-fingerprint sensor electrode layer 110 may be disposed together on the top surface of the base layer 100.

Figure 3:
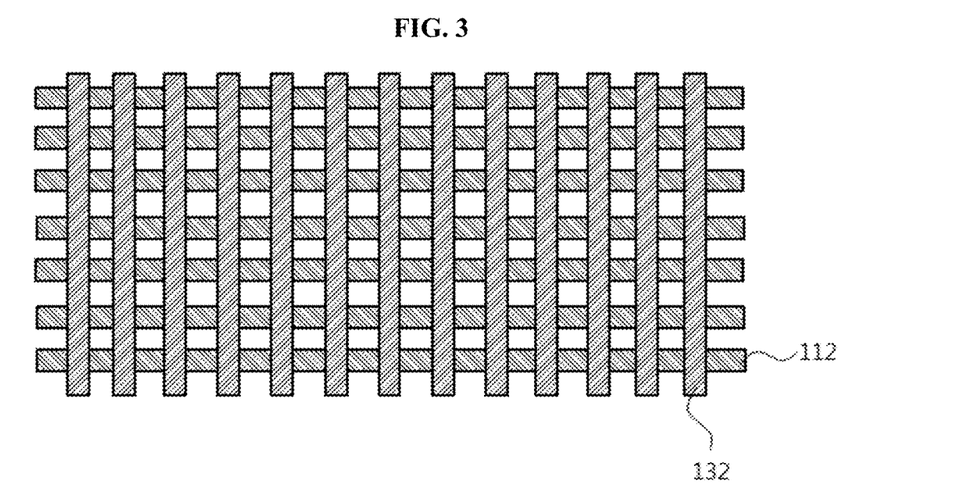
FIG. 3 is a schematic top planar view illustrating an arrangement of fingerprint sensor electrodes included in a multi-sensor structure in accordance with exemplary embodiments.

FIG. 3 is a schematic top planar view illustrating an arrangement of fingerprint sensor electrodes included in a multi-sensor structure in accordance with exemplary embodiments.

Referring to FIG. 3, the touch-fingerprint sensor electrode layers 110 and 130 may include fingerprint sensing lines 112 and 132 extending to cross each other. In exemplary embodiments, the first touch-fingerprint sensor electrode layer 110 may include first fingerprint sensing lines 112, and the second touch-fingerprint sensor electrode layer 130 may include second fingerprint sensing lines 132.

The first fingerprint sensing lines 112 may extend, e.g., in a row direction on the top surface of the base layer 100, and the second fingerprint sensing lines 132 may extend in a column direction on the insulating interlayer 120.

Figure 4:
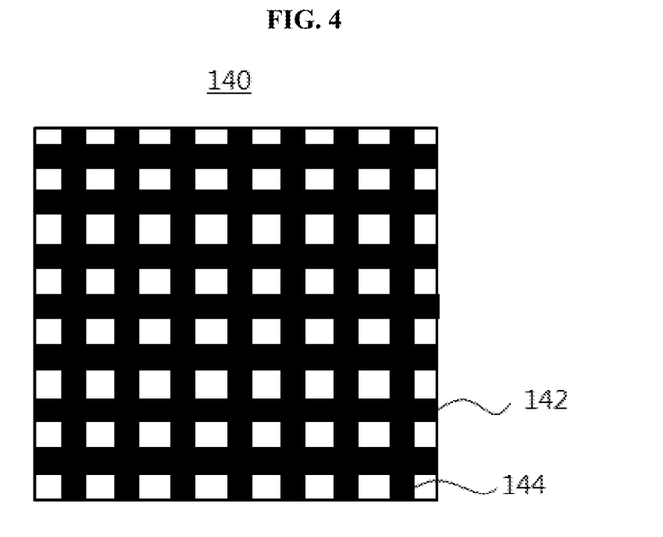
FIG. 4 is a schematic top planar view illustrating a structure of an antenna electrode included in a multi-sensor structure in accordance with exemplary embodiments.

FIG. 4 is a schematic top planar view illustrating a structure of an antenna electrode included in a multi-sensor structure in accordance with exemplary embodiments.

Referring to FIG. 4, the antenna electrode layer 140 may include a mesh pattern having a shape similar to that of the first and second fingerprint sensing lines 112 and 132.

In exemplary embodiments, the antenna electrode layer 140 may include a mesh pattern formed of the first antenna electrode line 142 and the second antenna electrode line 144 that may cross each other. For example, the first and second antenna electrode lines 142 and 144 may be arranged by the same line width and the same pitch (a spacing distance) as those of the first and second fingerprint sensing lines 112 and 132, respectively.

As described with reference to FIGS. 1 and 2, the antenna electrode layer 140 may be disposed at the same level as that of the first touch-fingerprint sensor electrode layer 110 or the second touch-fingerprint sensor electrode layer 130. Additionally, as described with reference to FIGS. 3 and 4, the antenna electrode layer 140 may be formed to include a mesh pattern formed of electrode lines having the same shape as that of the fingerprint sensing lines 112 and 132 so that uniformity of a pattern structure in a planar direction when viewed by a user may be enhanced.

Thus, a visible recognition of the electrode lines due to a pattern structure deviation may be prevented, and an entire transmittance of the multi-sensor structure may be improved.

Figure 5:
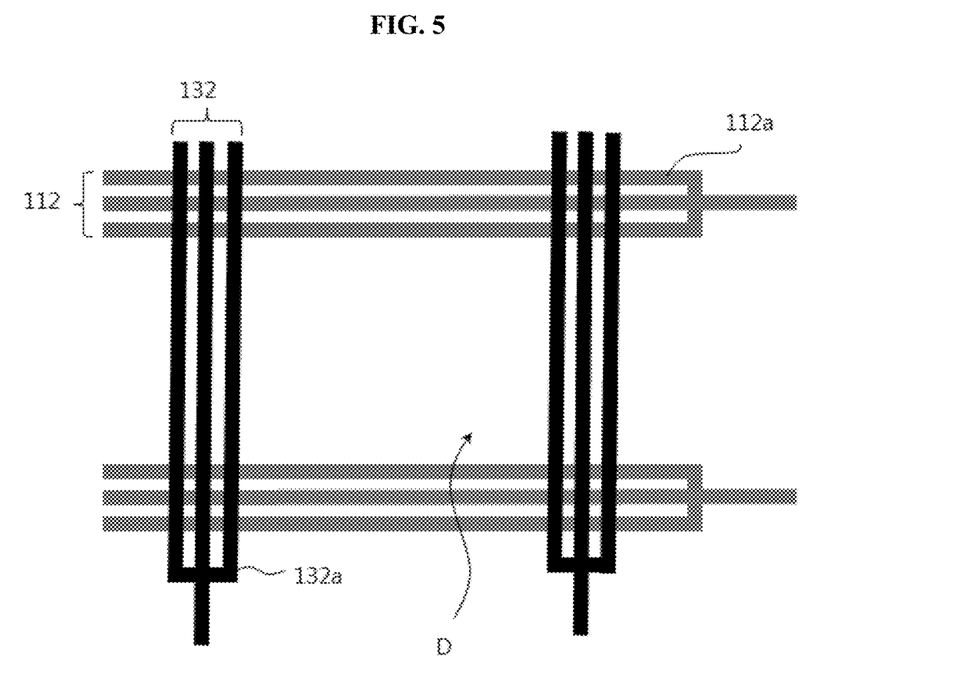
FIG. 5 is a schematic top planar view illustrating an electrode arrangement in a multi-sensor structure in accordance with exemplary embodiments.

FIG. 5 is a schematic top planar view illustrating an electrode arrangement in a multi-sensor structure in accordance with exemplary embodiments.

Referring to FIG. 5, when the first fingerprint sensing lines 112 and the second fingerprint sensing lines 132 neighboring each other are projected together on a plane, an area in which the fingerprint sensing lines 112 and 132 are not present may be defined as a dummy region D.

In some embodiments, each of the fingerprint sensing lines 112 and 132 may have a structure in which a plurality of sub-lines 112a and 132a are combined in a parallel connection. Accordingly, a channel resistance through the fingerprint sensing lines 112 and 132 may be reduced so that a fingerprint sensing sensitivity and resolution may be more enhanced.

For example, each first fingerprint sensing line 112 may include a plurality of first sub-lines 112a connected in parallel with each other, and each second fingerprint sensing line 132 may include a plurality of second sub-lines 132a connected in parallel with each other.

Figure 6:
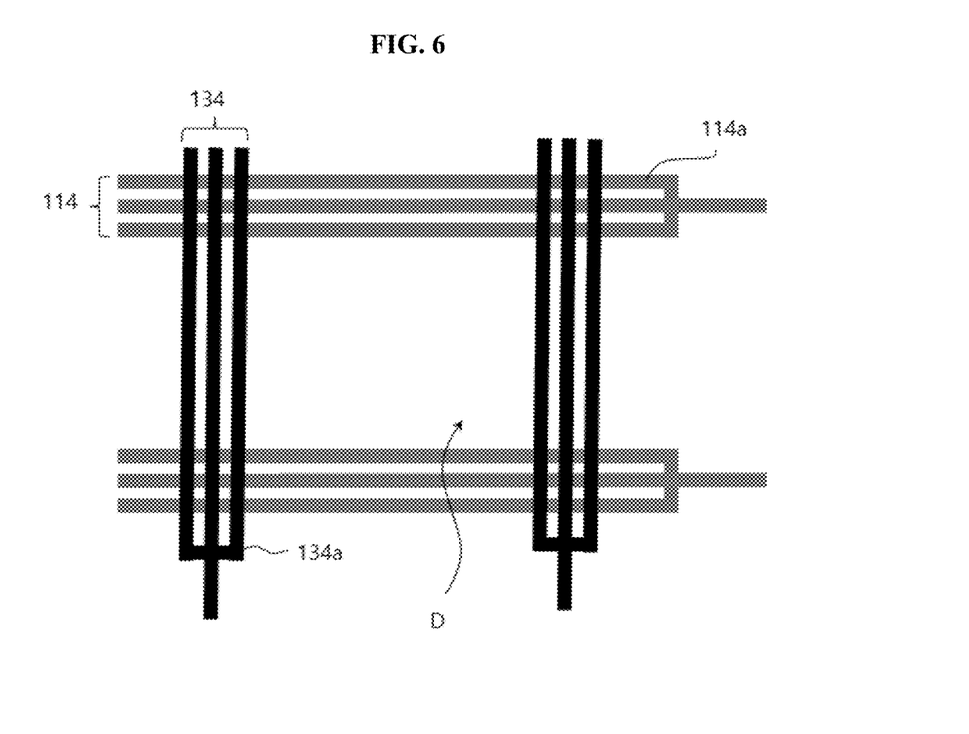
FIG. 6 is a schematic top planar view illustrating an electrode arrangement in a multi-sensor structure in accordance with exemplary embodiments.

FIG. 6 is a schematic top planar view illustrating an electrode arrangement in a multi-sensor structure in accordance with exemplary embodiments.

Referring to FIG. 6, a touch sensing structure included in the multi-sensor structure may also include first touch sensing lines 114 and second touch sensing lines 134 that may cross each other. The first touch sensing lines 114 may be included in the first touch-fingerprint sensor electrode layer 110, and the second touch sensing lines 134 may be included in the second touch-fingerprint sensor electrode layer 130.

In some embodiments, each of the touch sensing lines 114 and 134 may have a structure in which a plurality of sub-lines 114a and 134a are combined in a parallel connection.

For example, each first touch sensing line 114 may include a plurality of first sub-lines 114a connected in parallel with each other, and each second touch sensing line 134 may include a plurality of second sub-lines 134a connected in parallel with each other.

The touch sensing lines 114 and 134 and/or the sub-lines 114a and 134a included therein may be formed to have a structure/arrangement (e.g., a line-width, a pitch, etc.) substantially the same as or similar to that of the fingerprint sensing lines 112 and 132 and/or the sub-lines 112a and 132a included therein as described with reference to FIG. 5.

In some embodiments, a dummy region D may be also defined in a space between the first touch sensing lines 114 and the second touch sensing lines 134 crossing each other, and the antenna electrode layer 140 may be disposed in the dummy region D.

Figure 7:
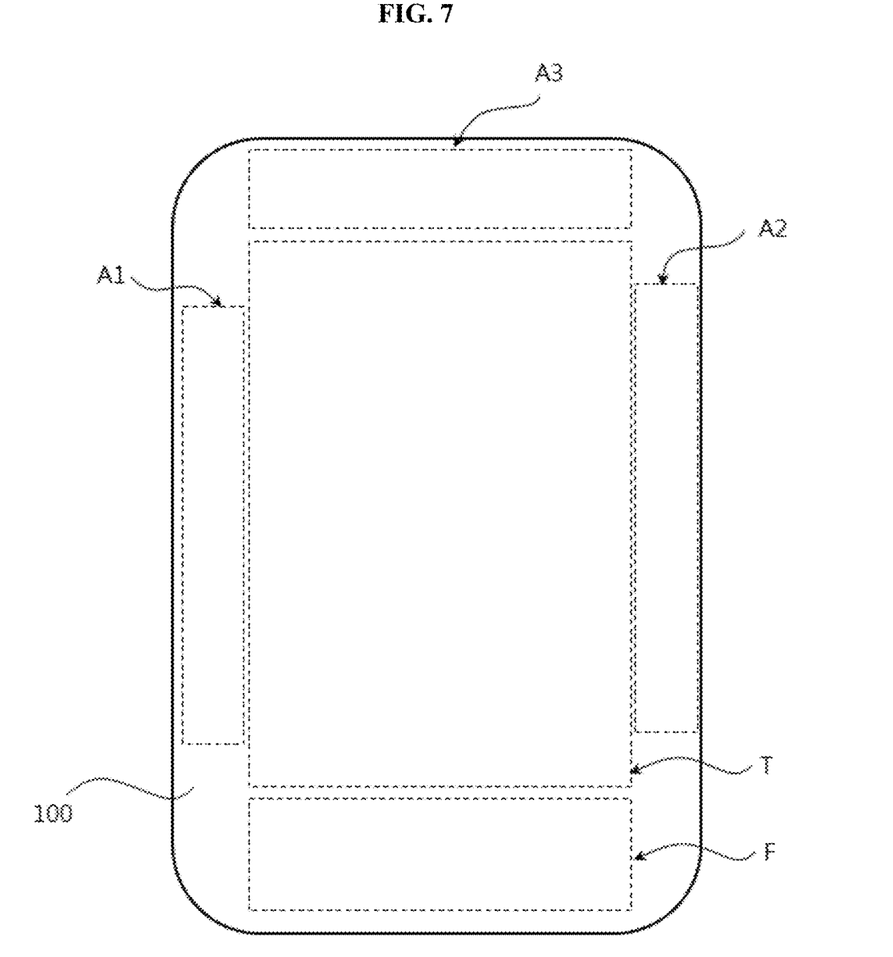
FIG. 7 is a schematic top planar view illustrating electrode areas in a multi-sensor structure in accordance with exemplary embodiments.

FIG. 7 is a schematic top planar view illustrating electrode areas in a multi-sensor structure in accordance with exemplary embodiments.

Referring to FIG. 7, the above-described multi-sensor structure may be applied to, e.g., a smart phone-type image display device. The base layer 100 in the image display device may individually include areas for the antenna electrode layer 140 and the touch-fingerprint sensor electrode layers 110 and 130.

In exemplary embodiments, a central area of the base layer 100 may be allocated as a touch sensor electrode area T. In some embodiments, the touch sensor electrode area T may include first and second touch sensing lines or first and second touch sensing electrodes 210 and 230 arranged in directions intersecting each other (see FIG. 8).

At least one area of peripheral areas adjacent to the touch sensor electrode area T may be allocated as a fingerprint sensor electrode area F. For example, the first and second fingerprint sensing lines 112 and 132 as described with reference to FIG. 3 may be arranged on the fingerprint sensor electrode area F. The first and second fingerprint sensing lines may be arranged with a smaller width and a smaller spacing (pitch) than those of the touch sensing electrodes 210 and 230.

At least one area except for the fingerprint sensor electrode area F among the peripheral areas adjacent to the touch sensor electrode area T may be allocated as an antenna electrode area. For example, at least one area of both lateral areas A1 and A2 of the touch sensor electrode region T and an upper area A3 of the base layer 100 may be allocated as the antenna electrode area.

Figure 8:
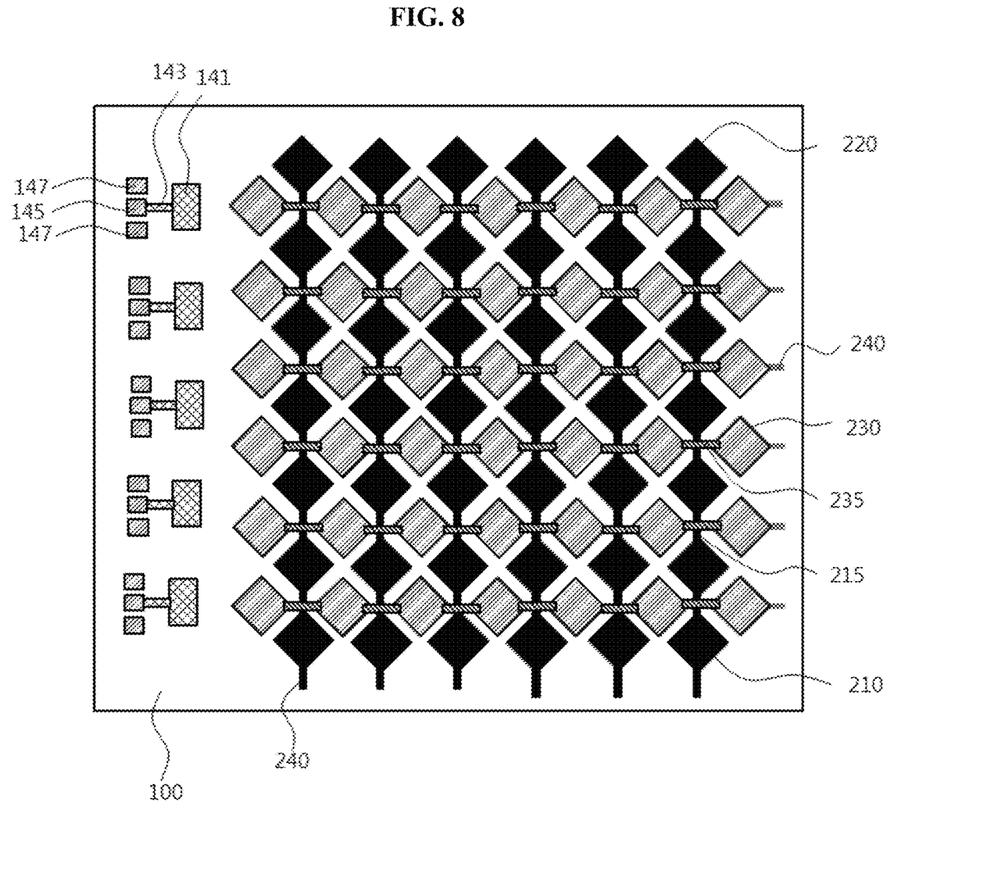
FIG. 8 is a schematic top planar view illustrating an arrangement of a touch sensing electrode and an antenna unit in a multi-sensor structure in accordance with exemplary embodiments.

An antenna unit as illustrated in FIG. 8 may be disposed on the antenna electrode area. For example, a plurality of the antenna units may be arranged in an array form.

As described above, the touch sensor electrode area T may be included in the central area of the image display device or the base layer 100 as the largest area. The fingerprint sensor electrode area F and the antenna electrode area may be allocated from the peripheral areas of the touch sensor electrode area T. Thus, spatial efficiency may be achieved while obtaining independent operation and driving of each sensor area.

In some embodiments, an integrated circuit (IC) chip for driving an antenna and a touch-fingerprint sensor may be connected via the peripheral area. For example, an antenna driving IC chip and a touch-fingerprint sensor driving IC chip may be separated and electrically connected to the antenna unit and the touch-fingerprint sensor electrode layer, respectively, via the peripheral area. For example, the peripheral area may individually include an antenna driving IC chip connection area and a touch-fingerprint sensor driving IC chip connection area.

In some embodiments, a plurality of the antenna driving IC chips and a plurality of the touch-fingerprint sensor driving IC chips may be disposed in the peripheral areas.

FIG. 7 illustrates an example of an electrode area arrangement for the formation of the antenna electrode layer 140 and the touch-fingerprint sensor electrode layers 110 and 130. The electrode area arrangement may be properly modified in consideration of a circuit construction and a design of the image display device.

FIG. 8 is a schematic top planar view illustrating an arrangement of a touch sensing electrode and an antenna unit in a multi-sensor structure in accordance with exemplary embodiments.

As described with reference to FIG. 7, touch sensing electrodes may be arranged on the touch sensor electrode area T. When a user's touch is input over the touch sensor electrode area T, a capacitance change may occur by touch sensing electrodes 210 and 230. Accordingly, a physical touch may be converted into an electrical signal to perform a predetermined sensing function.

The touch sensing electrodes 210 and 230 may include first touch sensing electrodes 210 and second touch sensing electrodes 230. The first touch sensing electrodes 210 and the second touch sensing electrodes 230 may be arranged in directions crossing each other.

In some embodiments, the first touch sensing electrodes 210 and the second touch sensing electrodes 230 may be disposed at the same level or at the same layer on a top surface of the base layer 100. For example, the first touch sensing electrodes 210 and the second touch sensing electrodes 230 may be included in the first touch-fingerprint sensor electrode layer 110 illustrated in FIGS. 1 and 2.

The first touch sensing electrodes 210 may be arranged along a column direction. The first touch sensing electrodes 210 may be connected along the column direction via a sensing electrode connection portion 215. The sensing electrode connection portion 215 may be integrally connected to the first touch sensing electrodes 210 to be provided as a substantially single member.

A plurality of first touch sensing electrodes 210 may be connected by the sensing electrode connection portions 215 so that a touch sensing channel column extending in the column direction may be defined. A plurality of the touch sensing channel columns may be arranged in a row direction.

The second touch sensing electrodes 230 may be arranged along the row direction. Each of the second touch sensing electrodes 230 may have an island pattern shape spaced apart from each other. The second touch sensing electrodes 230 neighboring in the row direction may be electrically connected to each other by a bridge electrode 235.

For example, a pair of the second touch sensing electrodes 230 neighboring each other with respect to the sensing electrode connection portion 215 included in the touch sensing channel column may be electrically connected to each other by the bridge electrode 235. Accordingly, a touch sensing channel row may be defined by the second touch sensing electrodes 230 and the bridge electrodes 235 connected in the row directions. A plurality of the touch sensing channel rows may be arranged along the column direction.

The insulating interlayer 120 illustrated in FIGS. 1 and 2 may at least partially cover the first and second touch sensing electrodes 210 and 230. The bridge electrode 235 may be formed through the insulating interlayer 120 to connect the neighboring second touch sensing electrodes 230.

In some embodiments, the bridge electrode 235 may be included in the second touch-fingerprint sensor electrode layer 130 illustrated in FIGS. 1 and 2. In this case, a top-bridge type touch sensor may be provided.

A trace 240 may extend from each of the touch sensing channel row and the touch sensing channel column. For example, the traces 240 may extend along a peripheral area of the touch sensor electrode area T and may be collected in a bonding area. End portions of the traces 240 may be electrically connected to the above-described touch-fingerprint sensor driving IC chip in the bonding area.

As illustrated in FIG. 8, the touch sensing electrodes 210 and 230 may be arranged according to a mutual capacitance type arrangement.

In some embodiments, the touch sensing electrodes 210 and 230 may be arranged according to a self-capacitance type arrangement. In this case, each of the touch sensing electrodes 210 and 230 may have an independent island pattern shape, and the trace 240 may be branched from each of the touch sensing electrodes 210 and 230 having the island pattern shape. Further, the sensing electrode connection portion 215 and the bridge electrode 235 may be omitted.

When the touch sensing electrodes 210 and 230 are disposed in a self-capacitance type arrangement, the touch sensing electrodes 210 and 230 may be included in any one of the first touch-fingerprint sensor electrode layer 110 or the second touch-fingerprint sensor electrode layer 130.

In an embodiment, when the touch sensing electrodes 210 and 230 are included in the second touch-fingerprint sensor electrode layer 130, the bridge electrode 235 may be included in the first touch-fingerprint sensor electrode layer 110. In this case, a touch sensor having a bottom-bridge type structure may be provided.

As described with reference to FIG. 7, antenna units may be arranged in the antenna electrode area adjacent to the touch sensor electrode area. The antenna unit may include a radiator 141, a transmission line 143, and a signal pad 145.

The radiator 141 may have, e.g., a polygonal plate shape, and the transmission line 143 may extend from the radiator 141. The signal pad 145 may be electrically connected to an end portion of the transmission line 143.

In an embodiment, the antenna unit may further include ground pads 147 that may be spaced apart from the signal pad 145 and may face each other with respect to the signal pad 145.

The antenna unit may be spaced apart from the touch sensing electrodes 210 and 230 and the traces 240 and may not overlap the touch sensing electrodes 210 and 230 and the traces 240 in a planar direction. Thus, signal interference between an antenna and a touch sensor may be prevented to provide independent signal sensing.

In some embodiments, the antenna unit or the radiator 141 may include a mesh pattern as described with reference to FIG. 4. In an embodiment, the touch sensing electrodes 210 and 230 may also each include a mesh pattern that may have substantially the same shape (the same line width and spacing) as that of the mesh pattern included in the antenna unit. Accordingly, uniformity of the electrode pattern included in the multi-sensor structure may be enhanced so that electrode visibility may be further suppressed.

Figure 9:
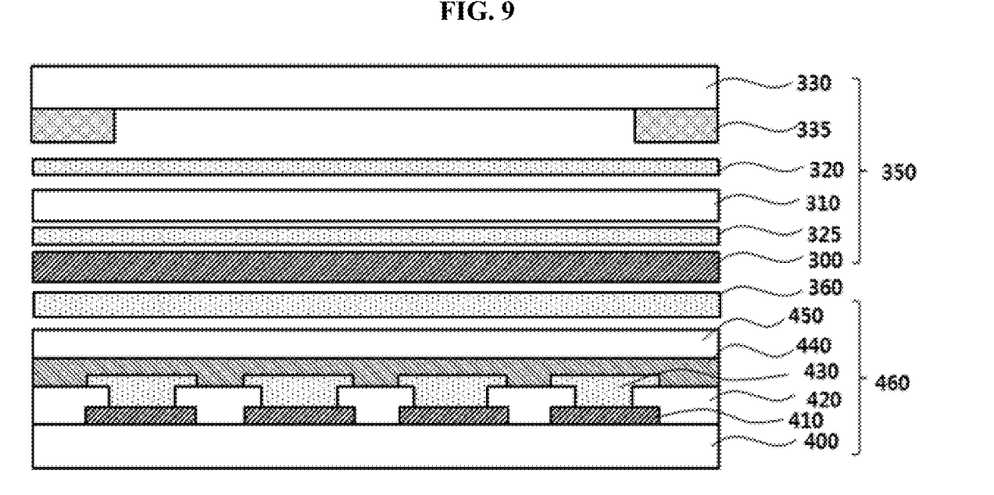
FIG. 9 is a schematic cross-sectional view illustrating an image display device in accordance with exemplary embodiments.

FIG. 9 is a schematic cross-sectional view illustrating an image display device in accordance with exemplary embodiments.

Referring to FIG. 9, the image display device may include a window stack structure 350 stacked on a display panel 460. The window stack structure 350 may include a window substrate 330, a polarizing layer 310 and a multi-sensor structure 300 according to exemplary embodiments as described above.

The window substrate 330 may include, e.g., a hard coating film, glass (e.g., ultra-thin glass (UTG)). In an embodiment, a light-shielding pattern 335 may be formed on a peripheral portion of a surface of the window substrate 330. The light-shielding pattern 335 may include a color-printed pattern, and may have a single-layered or multi-layered structure. A bezel portion or a non-display region of the image display device may be defined by the light-shielding pattern 335.

The polarizing layer 310 may include a coating-type polarizer or a polarizing plate. The coating-type polarizer may include a liquid crystal coating layer that may include a cross-linkable liquid crystal compound and a dichroic dye. In this case, the polarizing layer 310 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 310 may be directly attached to the surface of the window substrate 330 or may be attached via a first adhesive layer 320.

The multi-sensor structure 300 may be included in the window stack structure 350 as a film or a panel. In an embodiment, the multi-sensor structure 300 may be combined with the polarizing layer 310 via a second adhesive layer 325.

As illustrated in FIG. 9, the window substrate 330, the polarizing layer 310 and the multi-sensor structure 300 may be sequentially positioned from a viewer's side. In this case, the touch-fingerprint sensor electrode layer and the antenna electrode layer of the multi-sensor structure 300 may be disposed under the polarizing layer 310 so that electrode patterns may be effectively prevented from being recognized by the viewer.

In some embodiments, the multi-sensor structure 300 may be disposed between the window substrate 330 and the polarization layer 310. In this case, a sensing signal generation distance through the multi-sensor structure 300 may become decreased to improve sensing sensitivity.

The display panel 460 may include a pixel electrode 410, a pixel defining layer 420, a display layer 430, an opposing electrode 440 and an encapsulation layer 450 disposed on a panel substrate 400.

A pixel circuit including a thin film transistor (TFT) may be formed on the panel substrate 400, and insulation layer covering the pixel circuit may be formed. The pixel electrode 410 may be electrically connected to, e.g., a drain electrode of the TFT on the insulation layer.

The pixel defining layer 420 may be formed on the insulation layer, and the pixel electrode 410 may be exposed through the pixel defining layer 420 such that a pixel region may be defined. The display layer 430 may be formed on the pixel electrode 410, and the display layer 430 may include, e.g., a liquid crystal layer or an organic light emitting layer.

The opposing electrode 440 may be disposed on the pixel defining layer 420 and the display layer 430. The opposing electrode 440 may serve as, e.g., a common electrode or a cathode of the image display device. The encapsulation layer 450 may be disposed on the opposing electrode 440 to protect the display panel 460.

In some embodiments, the display panel 460 and the window stack structure 350 may be combined with each other through an adhesive layer 360. For example, a thickness of the adhesive layer 360 may be greater than each thickness of the first adhesive layer 320 and the second adhesive layer 325. A viscoelasticity of the adhesive layer 360 may be about 0.2 MPa or less at a temperature ranging from −20° C. to 80° C. In this case, a noise from the display panel 460 may be blocked, and an interface stress while being bent may be alleviated so that damages of the window stack structure 350 may be avoided. In an embodiment, the viscoelasticity of the adhesive layer 360 may be in a range from about 0.01 MPa to about 0.15 MPa.

As described above, structural and process efficiency may be improved by integrating touch sensing, fingerprint sensing and antenna signal sensing in the multi-sensor structure 300. Additionally, electrode visibility may be reduced through the above-described electrode shape and arrangement, and transmittance and image quality of the image display device may be also improved.

What is claimed is:

1. A multi-sensor structure, comprising:
a base layer;
a first touch-fingerprint sensor electrode layer disposed on a top surface of the base layer;
a second touch-fingerprint sensor electrode layer disposed at an upper level of the first touch-fingerprint sensor electrode layer; and
an antenna electrode layer spaced apart from the first touch-fingerprint sensor electrode layer and the second touch-fingerprint sensor electrode layer in a planar direction, the antenna electrode layer being disposed at the same level as that of the first touch-fingerprint sensor electrode layer or the second touch-fingerprint sensor electrode layer,
wherein the antenna electrode layer includes an antenna unit including a radiator, a transmission line extending from the radiator, a signal pad connected to an end portion of the transmission line, and ground pads facing each other with respect to the signal pad.

2. The multi-sensor structure according to claim 1, further comprising an insulating interlayer covering the first touch-fingerprint sensor electrode layer.

3. The multi-sensor structure according to claim 2, wherein the insulating interlayer covers the antenna electrode layer.

4. The multi-sensor structure according to claim 1, wherein the first touch-fingerprint sensor electrode layer includes first fingerprint sensing lines, and the second touch-fingerprint sensor electrode layer includes second fingerprint sensing lines extending in a direction intersecting the first fingerprint sensing lines.

5. The multi-sensor structure according to claim 4, wherein the antenna electrode layer includes a mesh pattern.

6. The multi-sensor structure according to claim 5, wherein the mesh pattern of the antenna electrode layer includes:
first antenna electrode lines having the same line width and spacing distance as those of the first fingerprint sensing lines; and
second antenna electrode lines having the same line width and spacing distance as those of the second fingerprint sensing lines.

7. The multi-sensor structure according to claim 5, wherein the first touch-fingerprint sensor electrode layer includes touch sensing electrodes, and the touch sensing electrodes include a mesh pattern having the same shape as that of the antenna electrode layer.

8. The multi-sensor structure according to claim 4, wherein each of the first fingerprint sensing lines includes first sub-lines connected in parallel with each other, and each of the second fingerprint sensing lines includes second sub-lines connected in parallel with each other.

9. The multi-sensor structure according to claim 4, wherein the first touch-fingerprint sensor electrode layer further includes first touch sensing lines, and the second touch-fingerprint sensor electrode layer further includes second touch sensing lines extending in a direction intersecting the first touch sensing lines.

10. The multi-sensor structure according to claim 9, each of the first touch sensing lines includes first sub-lines connected in parallel with each other, and each of the second touch sensing lines includes second sub-lines connected in parallel with each other.

11. The multi-sensor structure according to claim 9, wherein each of the first touch sensing lines and the first fingerprint sensing lines includes a plurality of first sub-lines having the same line width and the same pitch, and
each of the second touch sensing lines and the second fingerprint sensing lines includes a plurality of second sub-lines having the same line width and the same pitch.

12. The multi-sensor structure according to claim 1, wherein the top surface of the base layer includes a touch sensor electrode area at a central area thereof, and an antenna electrode area and a fingerprint sensor electrode area which are separated from each other at a peripheral area with respect to the touch sensor electrode area.

13. An image display device, comprising:
a display panel; and
the multi-sensor structure according to claim 1 stacked on the display panel.

14. A multi-sensor structure, comprising:
a base layer;
a first touch-fingerprint sensor electrode layer disposed on a top surface of the base layer;
a second touch-fingerprint sensor electrode layer disposed at an upper level of the first touch-fingerprint sensor electrode layer;
an insulating interlayer covering the first touch-fingerprint sensor electrode layer; and
an antenna electrode layer spaced apart from the first touch-fingerprint sensor electrode layer and the second touch-fingerprint sensor electrode layer in a planar direction, the antenna electrode layer being disposed at the same level as that of the second touch-fingerprint sensor electrode layer,
wherein the antenna electrode layer is disposed on the insulating interlayer together with the second touch-fingerprint sensor electrode layer.

* * * * *